UNITED STATES PATENT OFFICE.

CLYDE L. VORESS, OF NEW YORK, N. Y., AND VERNON C. CANTER, OF BRADFORD, PENNSYLVANIA, ASSIGNORS TO GASOLINE RECOVERY CORPORATION, A CORPORATION OF DELAWARE.

METHOD OF VOLATILIZING, DISTILLING, OR SEPARATING ABSORBED VAPORS.

with other objects in view, which will appear as the description proceeds, the invention consists in the novel method hereinafter described in detail illustrated in the accompanying drawing and more particularly set forth in the appended claims.

The drawing shows a diagrammatic view of an apparatus which we have found suitable for carrying out the new process.

For the purpose of the present application, the following description relates to the recovery of gasoline vapors from natural gas, and the absorbent medium used is activated charcoal, while the heating element, or distillation vapor, is superheated steam.

Referring to the drawing, A is a steam generator and heating unit, B is a metal drum containing activated charcoal, C is a water cooled condenser and D is a separation tank.

By the present practice of operating the system, natural gas containing the gasoline vapors to be recovered, is introduced through pipe 1 and valve 2, into absorber B where it passes upwardly through the charcoal, which absorbs and retains the major portion of the gasoline vapors. The denuded, or partially denuded, vapors leave the absorber by pipe 7 and valve 5. When a sufficient quantity of gasoline vapor has been absorbed (this is usually fifteen to twenty per cent of the weight of the charcoal), superheated steam from the heating unit A is introduced through valve 6 and pipe 7 into the charcoal 3 containing the absorbed vapors. As these vapors are evolved, they pass out through pipe 8 and valve 9 into the condenser and from there into the separating tank.

At this point it may be stated that the temperature of the superheated steam may be considerably lower than the temperature of the steam heretofore used, but if the temperature of the steam is as high, or higher, than that heretofore used, the distillation may be more complete. At any rate we pass the superheated steam through the absorbent for a sufficient time only to drive out the major portion of the vapors and to fill, or partially fill, the capillaries of the charcoal with the condensate formed from the steam. When the majority of the absorbed vapors have been distilled from the charcoal, the valves 6 and 9 are immediately closed and at this time the charcoal will contain a large amount of condensate from the steam. It will be understood at this point that all of the absorbed vapors have not been removed but a small percentage, 2% or more, remain in the capillaries of the charcoal with a large portion of condensate from the steam. The significance of this will be made apparent later. Then gas, from which the major portion of the gasoline vapors have been removed in another charcoal absorber, is admitted through pipe 1 and valve 3 and it comes into intimate contact with the charcoal which contains the condensate from the steam. This gas passes out again by line 7 and valve 5. In the passage of the cooling gas through the charcoal two heat interchanges take place; one is the addition of heat due to the condensation of the light vapors, the other is the removal of heat due to the evaporation of water. In addition to these heat changes there is the actual cooling of the charcoal by the gas.

The entire process as described in this invention is a cycle of absorptions and displacements rather than absorptions and evacuations by heating. Starting with a body of charcoal saturated with absorbed vapors to be recovered the first displacement is that of the absorbed vapors by condensed steam. This takes place at a temperature much higher, relatively, than the ordinary absorption of the absorbed vapors. The absorbed vapors are not removed entirely from the capillaries but a small percentage of the heavier fractions remains. This displacement has been assisted by the latent heat of the condensed steam and the displaced absorbed vapors have been swept out by such steam vapors as have not condensed and by their own developed pressure. The second displacement is that of the condensed distilling vapors by light vapors from the cooling gas. Natural gas contains, after the majority of its gasoline vapors are removed, fractions which will condense in the charcoal capillaries at ordinary temperatures and pressures. As these are passed into intimate contact with the charcoal containing the condensed distilling vapors, the temperature of the charcoal is quickly reduced and the displacement of the distilling vapors takes place. Distillation is the reverse of absorption so that this displacement is brought about by causing the equilibrium between the distilling vapors and the cooling vapors to swing toward the cooling vapors by the addition of cool lighter vapors. It will be understood at this point that the displacement is assisted by the fact that the charcoal capillary always contains a small percentage of the heavier absorbed vapors which are not miscible with the condensed steam. This percentage of heavier absorbed gasoline forms a film over the inner surface of the capillary and prevents the water from actually wetting the surface of the charcoal, thus leaving it in a condition more easily displaceable. The third displacement is that of the lighter vapors by the heavier vapors from the rich gas at ordinary temperatures and pressures. This is "selective absorption" as already described in the literature. Charcoal has a greater attraction for higher boiling gasolines than lower boiling hydrocarbons and will absorb the higher boiling gasolines to displace the lower boiling hydrocarbons. It will be understood at this point that the absorption of the gasoline from the rich gas is made despite the fact that the charcoal already contains a small percentage of high boiling gasolines left in from the previous distillation. The total percentage of this gasoline compared with the volume of gasoline recovered each absorption may be as high as 20% by volume. All other things being equal, this really assists the absorption of the lighter gasoline by reducing the vapor pressure within the capillary. These three steps, or displacements, form a complete cycle for the extraction of vapors from gas mixtures.

The steps of displacement of the steam by the lighter vapors and the displacement of the lighter vapors by the heavier gasoline vapors may be combined, if desired, so that the lighter vapors are displacing the steam and the heavier vapors displacing the lighter vapors in different parts of a body of charcoal at the same time.

Prior to the present invention it has been standard practice to introduce steam into the charcoal heated to between 200 and 500° C. When this steam first contacts with the cooler charged charcoal, condensation of a certain portion of the steam immediately took place and much of this moisture remained in the capillaries of the charcoal. The highly heated steam was passed through the charcoal for a comparatively great length of time so that it not only removed the absorbed vapors but it also removed the aqueous condensation. This prior practice is costly from two view points: namely, the volume of steam necessary for the distillation and the volume of denuded gas necessary for the cooling of the charcoal. Of the steam necessary for distillation over 75% is used to drive out the steam condensed in the charcoal.

As before stated, we have discovered that if steam at 200° C or less is passed into the absorber, a very large percentage of the absorbed gasoline vapor is removed in a very short time but the capillaries of the charcoal remain filled with water vapor for a longer period than heretofore. The distillation is the result mainly of the capillary displacement of the gasoline vapors by the distilling vapors in the presence of heat supplied mainly from the latent heat of the condensed steam.

We have discovered further that if only a small amount, less than 25% of the amount of steam formerly used, is passed into the charcoal and then relatively cool gas is immediately introduced into the charcoal the water vapors are in turn displaced by the vapors from the flowing gas and carried out of the charcoal and this leaves the latter in a finely activated and relatively cool state. In addition to this, on account of the charcoal being relatively cool and containing a small percentage of high boiling gasoline, the ensuing absorption is more thorough and satisfactory.

We have found also that the volume of gas necessary to affect the cooling and displacement of the water vapor is not more than half the amount used for cooling by the former method. We have also found that the amount of the steam can be reduced by our method so that less than 15 pounds of steam at 150° C., per gallon of gasoline recovered is required.

In our explanation we do not wish to limit ourselves to the particular case or example given here as we have already applied the process to other substances and by other means than that specifically described and we are aware that our invention may be applied in other ways without departing from the spirit of the process as expressed in the claims.

For a treatise on "selective absorption" see Burrell, Oberfell & Voress—Chemical & Metallurgical Engineer, Jan. 26th, 1921—page 157.

Specific applications of the herein described process are claimed in our copending applications for patent, Serial Nos. 537,569 and 537,570, filed Feb. 18, 1922.

What we claim and desire to secure by Letters Patent is:

1. A process for the recovery of vapors from gas mixtures by the method of absorption in a solid absorbent medium which consists in displacing absorbed vapors by condensed distilling vapors at a temperature higher than the temperature at which the absorbed vapors were absorbed, then displacing the distilling vapors by lighter vapors for the most part at a temperature lower than that at which the distilling vapors were absorbed and finally displacing the lighter vapors by heavier vapors at a temperature lower than the temperature at which the distilling vapors were absorbed.

2. A method of separating vapors from solid absorbents, consisting in passing distilling vapors into the vapor charged absorbent for a sufficient time, only, to displace the major portion of the first mentioned vapors and to deposit a portion of the condensates from the distillation vapors in said absorbent.

3. A method of separating vapors from solid absorbents consisting in passing distilling vapors into the vapor charged absorbent for a sufficient time, only to displace the major portion of the first mentioned vapors with condensed distilling vapors at a temperature substantially above that at which the absorbed vapors were absorbed.

4. A method of the kind set forth in claim 3, in which the distillation vapors include steam.

5. A method of the kind defined in claim 3, in which the distillation vapors consist of superheated steam.

6. A method of the kind defined by claim 3, having the added step of removing the condensate of the distillation vapors from the absorbent by introducing substantially denuded gas into the absorbent for driving the distillation vapors condensate from the absorbent and for cooling the latter.

7. A method of the kind defined in claim 3, having the added step of displacing the condensate of the distillation vapors from the absorbent at a temperature substantially below the temperature at which the distillation vapors were absorbed by introducing substantially denuded gas into the absorbent for driving the distillation vapors condensate from the absorbent and for cooling the latter.

8. A method of the kind defined by claim 3, including the added steps of separating the distillation vapors condensate from the absorbent by introducing through the absorbent, a gas containing lighter vapors than those first separated, and continuing the passage of the substantially denuded gas until the absorption is sufficiently cool and free from distillation vapors to permit the absorption of heavier vapors by "selection."

9. A method of continuously absorbing and separating vapors in and from solid absorbents consisting in passing a gaseous mixture containing vapors to be recovered into said absorbent, then introducing distilling vapors into the charged absorbent for a sufficient time only to displace the major portion of the first mentioned vapors and to deposit condensates from the distilling vapors in said absorbent, then introducing a second gas mixture carrying vapors of lower boiling points than the vapors to be recovered through said absorbent for a sufficient time to displace the condensate of the distillation vapors and to deposit a portion of lighter vapors carried by the second gas mixture, and subsequently introducing more of the first gas mixture carrying vapors to be recovered into the absorbent which has been cooled by the second gas mixture.

10. A method of the kind defined by claim 9, in which the solid absorbent consists of activated charcoal.

11. A method of the kind defined by claim 9, in which the distillation vapors include steam.

12. A method of the kind defined by claim 9, in which the distillation vapors consists of superheated steam.

13. In a process for the recovery, or removal, of vapor mixtures from gas mixtures by the method of absorption in a solid absorbent and the subsequent distillation of the vapors therefrom by heated distillation vapors, the step of passing the distillation vapors into intimate contact with charged absorbent for a time only sufficient to volatilize the major portion of the absorbed vapors therefrom, and the subsequent passing of substantially denuded gas through said absorbent for the displacement of the condensates of the distillation vapors.

14. A method of continuously absorbing and separating vapors in and from solid absorbents consisting in passing a gaseous mixture containing vapors to be recovered into said absorbent, then introducing distilling vapors into the charged absorbent for a sufficient time only to displace the first mentioned vapors and to deposit condensates from the distilling vapors in said absorbent, then introducing more of the first gaseous mixture into the absorbent to cool it and displace the distilling vapors at a temperature lower than that at which the vapors to be recovered were displaced by the distilling vapors.

15. A method of the kind defined in claim 14, in which the distilling vapor is steam.

16. A process for the recovery of gasoline vapors from gas mixtures by the method of absorption in activated charcoal, which consists in displacing gasoline vapors from the charcoal by condensed distilling vapors at a temperature higher than the temperature at which the gasoline was originally absorbed, then displacing the distilling vapors by lighter hydro-carbon vapors from substantially denuded gas at a temperature for the most part lower than that at which the gasoline vapors were distilled from the charcoal, and then displacing the lighter hydro-carbon vapors by heavier gasoline vapors at a temperature lower than the temperature at which the previous displacement of gasoline by the distilling vapors was made.

17. A process for the recovery of gasoline vapors from gas mixtures by the method of absorption in activated charcoal, which consists in displacing gasoline vapors by condensed steam at a temperature approximating the boiling point of water, at the pressure prevalent, then displacing the condensed steam by lighter hydrocarbon vapors at a temperature for the most part substantially lower than the boiling point of water, and then displacing the lighter hydro-carbon vapors by heavier gasoline vapors at a temperature substantially less than the boiling point of water.

18. A method of separating gasoline from activated charcoal consisting in passing distilling vapors into the gasoline charged charcoal for a sufficient time only to displace the major portion of the gasoline and to deposit the portion of the condensates from the distillation vapors into said absorbent.

19. A method of the kind set forth in claim 18, in which the distilling vapor is steam.

20. A method of separating gasoline from activated charcoal consisting in passing steam into the gasoline charged charcoal for a sufficient time only to displace the major portion of the gasoline and to deposit a portion of the condensed steam in said charcoal at a temperature substantially that of boiling water.

21. A method of the kind defined in claim 20, having the added step of removing the condensed steam from the charcoal by introducing substantially denuded gas into the absorbent for displacing the condensed steam from the absorbent and for cooling the latter.

22. A method of the kind defined in claim 20, having the added step of displacing the condensed steam from the charcoal by indroducing substantially denuded gas into the charcoal at a temperature for the most part substantially below the boiling point of water.

23. A method of continuously absorbing and separating gasoline vapors in and from activated charcoal consisting in passing gaseous mixture containing the gasoline vapors to be recovered into said charcoal, then introducing distilling vapors into the charged charcoal for a sufficient time only to displace the gasoline vapors and to deposit condensates from the distilling vapors in said absorbent, then introducing the gas previously contacted with charcoal through said absorbent for a sufficient time to displace the condensate of the distilling vapors with lighter vapors and subsequently introducing gas carrying vapors to be recovered into the charcoal which has been cooled by a previous gas passage.

24. A method of continuously absorbing and separating gasoline vapors in, and from, charcoal, consisting in passing the gaseous mixture containing the gasoline vapors to be recovered into said charcoal, then introducing steam into the charged charcoal for a sufficient time only to displace the gasoline and to deposit condensed steam in the charcoal, then introducing a gas containing condensable fractions for a sufficient time to displace the condensed steam with the condensable vapors and subsequently introducing the gas mixture carrying the gasoline vapors into the charcoal where the gasoline vapors displace the lighter vapors.

25. A method of continuously absorbing and separating gasoline vapors from active charcoal consisting in passing a gaseous mixture containing the gasoline to be absorbed and separated into intimate contact with the charcoal, then introducing steam into the charcoal for a sufficient time to displace the first mentioned vapors from the capillaries with condensed steam, then introducing more of the gaseous mixture containing the gasoline to be absorbed and separated to cool the absorbent and displace the steam from the capillaries at a temperature lower than that at which gasoline vapors were previously displaced by the steam.

26. A method of the kind described in claim 25, in which two drums of charcoal are used alternately in such a manner that the charcoal in one is being contacted with the gaseous mixture containing the gasoline while the charcoal in the other is being contacted with the steam for the displacement of the absorbed gasoline.

27. In a process for the recovery, or removal, of gasoline from natural gas by the method of absorption in activated charcoal and the subsequent distillation of the vapors therefrom by steam, the step of passing the steam into intimate contact with the charged charcoal for a time only sufficient to volatilize the major portion of the gasoline therefrom and the subsequent passing of natural gas previously denuded of its heavier gasoline vapors through said charcoal for the displacement of the condensed steam.

In testimony whereof we affix our signatures.

CLYDE L. VORESS.
VERNON C. CANTER.